United States Patent
Landesfeind et al.

(10) Patent No.: US 6,842,675 B2
(45) Date of Patent: Jan. 11, 2005

(54) ASSEMBLY AND METHOD FOR MONITORING THE DRIVING CONDITION OF A VEHICLE

(75) Inventors: Klaus Landesfeind, Backnang (DE); Thomas Braun, Murr (DE)

(73) Assignee: Robert Bosch GmbH, Stuttgart (DE)

(*) Notice: Subject to any disclaimer, the term of this patent is extended or adjusted under 35 U.S.C. 154(b) by 11 days.

(21) Appl. No.: 10/204,760

(22) PCT Filed: Dec. 18, 2001

(86) PCT No.: PCT/DE01/04736
§ 371 (c)(1),
(2), (4) Date: Nov. 25, 2002

(87) PCT Pub. No.: WO02/051681
PCT Pub. Date: Jul. 4, 2002

(65) Prior Publication Data
US 2003/0144776 A1 Jul. 31, 2003

(30) Foreign Application Priority Data
Dec. 23, 2000 (DE) .......................... 100 65 011

(51) Int. Cl.⁷ .......................................... G01M 17/00
(52) U.S. Cl. .......................................... 701/29; 701/1
(58) Field of Search .............................. 707/29, 1, 41, 707/38; 280/5.506, 5.508

(56) References Cited

U.S. PATENT DOCUMENTS

| | | | |
|---|---|---|---|
| 5,066,041 A | * 11/1991 | Kindermann et al. | 280/5.506 |
| 5,257,814 A | * 11/1993 | Kohara | 280/5.508 |
| 5,418,723 A | * 5/1995 | Reichelt et al. | 701/41 |
| 5,513,108 A | * 4/1996 | Kishimoto et al. | 701/38 |
| 5,717,590 A | 2/1998 | Mihalko | |

FOREIGN PATENT DOCUMENTS

| | | |
|---|---|---|
| DE | 91 06 642 | 7/1991 |
| DE | 44 19 650 | 7/1995 |
| DE | 199 09 948 | 9/2000 |
| EP | 0 348 634 | 1/1990 |
| EP | 0 706 905 | 4/1996 |

* cited by examiner

Primary Examiner—Marthe Y. Marc-Coleman
(74) Attorney, Agent, or Firm—Kenyon & Kenyon

(57) ABSTRACT

The present invention relates to an arrangement for monitoring the driving condition of a vehicle, having means for generating a steering angle signal ($L_w$) and means for generating a transverse acceleration signal ($a_y$), means being provided for comparing a signal derived from the steering angle signal $L_w$ to a maximum steering angle signal, means being provided for comparing a signal derived from the transverse acceleration signal ($a_y$) to a maximum transverse acceleration signal, and a variable (F) that describes the driving condition of the vehicle being derivable from the comparison. The present invention also relates to a method of monitoring the driving condition of a vehicle.

14 Claims, 1 Drawing Sheet

ASSEMBLY AND METHOD FOR MONITORING THE DRIVING CONDITION OF A VEHICLE

Figure 1:
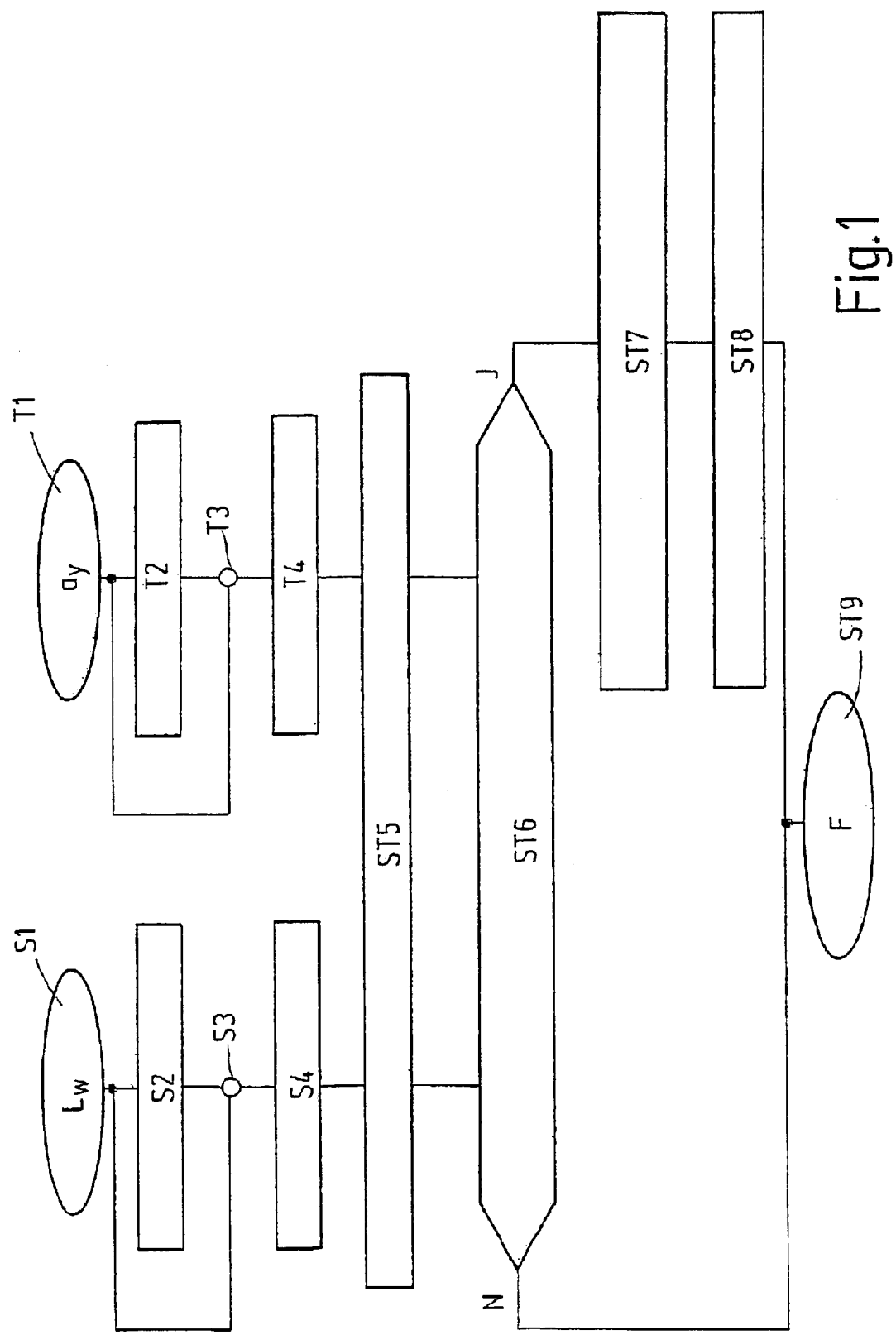

The present invention relates to a system for monitoring the driving condition of a vehicle using means of generating a steering angle signal and means of generating a transverse acceleration signal. The present invention also relates to a method of monitoring the driving condition of a vehicle having these steps: generating a steering angle signal and generating a transverse acceleration signal.

BACKGROUND INFORMATION

Generic arrangements and methods of this type are used in numerous modifications for monitoring, controlling and regulating the handling of motor vehicles.

For example, the system "ESP" (Electronic Stability Program) is known as an active driving safety system. ESP gives the driver improved basic functions in terms of the ABS (Antilock Brake System) and TCS (Traction Control System), and ESP also helps the driver in critical driving situations. These critical situations relate not only to critical situations of longitudinal dynamics, for example full braking or acceleration, but also to critical situations of transverse acceleration, for example skidding of the vehicle.

For stabilization of the transverse dynamics of the vehicle, the yaw rate signal is of central importance. The signal response of the yaw rate signal and model variables are therefore checked by various monitoring systems. Very fast and direct signal monitoring is represented for example by gradient monitoring. Here the change in the yaw rate signal within a certain time window is examined. If there is a change which is greater than a predefined threshold value, the conclusion is drawn that a malfunction is present. This may result for example in an intervention in the driving dynamics by the ESP.

It is desired, however, that intentional extreme driving maneuvers or certain road conditions do not result in detection of a malfunction. For this reason one is forced to set the threshold at which a malfunction is detected sufficiently high. But this in turn has the disadvantage that in situations which actually are critical in terms of signal technology, a desired deactivation sometimes fails to occur.

ADVANTAGES OF THE INVENTION

The present invention builds on the generic arrangement by providing means of comparing a signal derived from the steering angle signal with a maximum steering angle signal, by providing means for comparing a signal derived from the transverse acceleration signal with a maximum transverse acceleration signal, and by the possibility of deriving a variable that describes the driving condition of the vehicle from the comparisons. In this way it is possible to monitor the driving condition via a variable threshold. It is possible to set the error threshold higher, as more dynamic driving occurs. One thus avoids an intervention in the driving dynamics when driving in a dynamic manner. A critical threshold may also be provided in order to regulate the driving dynamics reliably in critical situations.

It is preferred that the steering angle signal and the transverse acceleration signal each be routable to a low-pass filter, a filtered steering angle signal and a filtered transverse acceleration signal being output by the low-pass filters; that means be provided for generating the absolute value of the difference between the steering angle signal and the filtered steering angle signal, that means be provided for generating the absolute value of the difference between the transverse acceleration signal and the filtered transverse acceleration signal, and that a variable which describes the driving condition of the vehicle be derivable from these absolute values. The named differential signals between the raw signals and the low-pass filtered signals are particularly well suited for sensitive monitoring of the driving condition of the vehicle.

It is particularly preferred for the absolute value of the difference between the steering angle signal and the filtered steering angle signal to be normalized to the maximum steering angle signal, for the absolute value of the difference between the transverse acceleration signal and the filtered transverse acceleration signal to be normalized to the maximum transverse acceleration signal, and for a variable that describes the driving state of the vehicle to also be derivable from the normalized absolute values. These normalized absolute values may lie between 0% and 100%, 0% preferably corresponding to a steady-state driving condition and 100% corresponding to a non-steady-state driving condition. The normalized variables may then be processed further to determine the variable that describes the driving condition of the vehicle.

It is advantageous that a variable that describes the driving condition of the vehicle is derivable from the maximum of the normalized absolute values. In this way both the behavior of the steering angle and the behavior of the transverse acceleration are taken into account.

It is particularly advantageous for the absolute value of the difference between the steering angle signal and the filtered steering angle signal to be compared to the maximum steering angle signal, and for a value of 100% to be assigned to the normalized absolute value of the difference between the steering angle signal and the filtered steering angle signal if the absolute value of the difference between the steering angle signal and the filtered steering angle signal is greater than or equal to the maximum steering angle signal. In this respect it is possible to provide a variable which lies between 0% and 100% for all driving situations, 100% covering all driving conditions that are accompanied by a steering angle signal higher than the maximum steering angle signal.

In a comparable manner, it is advantageous for the absolute value of the difference between the transverse acceleration signal and the filtered transverse acceleration signal to be compared to the maximum transverse acceleration signal, and for a value of 100% to be assigned to the normalized absolute value of the difference between the transverse acceleration signal and the filtered transverse acceleration signal, if the absolute value of the difference between the transverse acceleration signal and the filtered transverse acceleration signal is greater than or equal to the maximum transverse acceleration signal. Thus in terms of the value range of the transverse acceleration signal, conditions exist comparable to those for the value range of the steering angle signal. The two normalized signals have a minimum value of 0%, this value being assigned from a range of digital values between 0 and 255 if the absolute value of the respective differences is smaller than 2 bits.

It is preferred that a change in the driving condition to a non-steady-state driving condition be taken over directly into the variable describing the driving condition. If the variable corresponding to the driving condition in a current polling cycle is smaller than the variable for the driving condition in the preceding cycle, then the variable for the current driving condition is taken over as the variable for the driving condition.

It is preferred, however, that a change in driving condition to a steady-state driving condition be taken over into the variable that describes the driving condition in such a manner as to limit the gradient over a time window. This may be done in such a way that for every point in time t corresponding to the cycle (for example every 200 ms) the variable of the driving condition from the previous cycle is incremented by 1 and taken over into the variable of the driving condition if the present variable of the driving condition is greater than the variable of the driving condition in the last cycle.

The present invention builds on the generic method in that a signal derived from the steering angle signal is compared to a maximum steering angle signal, a signal derived from the transverse acceleration signal is compared to a maximum transverse acceleration signal, and a variable that describes the driving condition of the vehicle is derived from the comparisons. In this way it is possible to monitor the driving condition via a variable threshold. It is possible to set the error threshold higher when more dynamic driving occurs. One thus avoids an intervention in the driving dynamics when driving in a dynamic manner. A critical threshold may be provided in order to regulate the driving dynamics reliably in critical situations.

It is preferred that the steering angle signal and the transverse acceleration signal each be routed to a low-pass filter, a filtered steering angle signal and a filtered transverse acceleration signal being output by the low-pass filters; that the absolute value of the difference between the steering angle signal and the filtered steering angle signal be generated, that the absolute value of the difference between the transverse acceleration signal and the filtered transverse acceleration signal be generated, and that a variable that describes the driving condition of the vehicle be derived from the absolute values. The named differential signals between the raw signals and the low-pass filtered signals are particularly well suited for sensitive monitoring of the driving condition of the vehicle.

It is also advantageous for the absolute value of the difference between the steering angle signal and the filtered steering angle signal to be normalized to the maximum steering angle signal, for the absolute value of the difference between the transverse acceleration signal and the filtered transverse acceleration signal to be normalized to the maximum transverse acceleration signal, and for a variable that describes the driving condition of the vehicle to be derived from the normalized absolute values. These normalized absolute values may lie between 0% and 100%, 0% preferably corresponding to a steady-state driving condition and 100% to a non-steady-state driving condition. The normalized variables may then be processed further to determine the variable that describes the driving condition of the vehicle.

The method is particularly advantageous due to the fact that a variable describing the driving condition of the vehicle is derived from the maximum of the normalized absolute values. Thus both the behavior of the steering angle and the behavior of the transverse acceleration are taken into account.

It is advantageous that the absolute value of the difference between the steering angle signal and the filtered steering angle signal is compared to the maximum steering angle signal, and that a value of 100% is assigned to the normalized absolute value of the difference between the steering angle signal and the filtered steering angle signal if the absolute value of the difference between the steering angle signal and the filtered steering angle signal is greater than or equal to the maximum steering angle signal. In this respect it is possible to provide a variable which lies between 0% and 100% for all driving situations, 100% covering all driving conditions that are accompanied by a steering angle signal higher than the maximum steering angle signal.

In a similar manner, the method is advantageous due to the fact that the absolute value of the difference between the transverse acceleration signal and the filtered transverse acceleration signal is compared to the maximum transverse acceleration signal, and that a value of 100% is assigned to the normalized absolute value of the difference between the transverse acceleration signal and the filtered transverse acceleration signal, if the absolute value of the difference between the transverse acceleration signal and the filtered transverse acceleration signal is greater than or equal to the maximum transverse acceleration signal. Thus in terms of the value range of the transverse acceleration signal, conditions exist comparable to those for the value range of the steering angle signal. The two normalized signals have a minimum value of 0%, this value being assigned from a range of digital values between 0 and 255 if the absolute value of the respective differences is smaller than 2 bits.

The method is particularly advantageously refined by having a change in the driving condition to a non-steady-state driving condition be taken over directly into the variable describing the driving condition. If the variable corresponding to the driving condition in a current polling cycle is smaller than the variable of the driving condition in the preceding cycle, then the variable of the current driving condition is taken over as the variable for the driving condition.

In this connection it is also advantageous that a change in driving condition to a steady-state driving condition is taken over into the variable that describes the driving condition in a manner such as to limit the gradient over a time window. This may be done in such a way that for every point in time t corresponding to the cycle (for example every 200 ms) the variable of the driving condition from the previous cycle is incremented by 1 and taken over into the variable of the driving condition if the present variable of the driving condition is greater than the variable of the driving condition in the last cycle.

The present invention is based on the knowledge that it is possible to ascertain the driving condition, and that the deactivation thresholds of the yaw rate monitoring may be adapted to match the particular driving condition. This makes tighter and variable monitoring thresholds possible, and may be utilized to advantage in gradient monitoring of the yaw rate signal, in bit monitoring of the yaw rate signal, and when monitoring the range of the yaw rate signal for physically plausible values. It is possible to set the error threshold higher when more dynamic driving occurs. The "normalized deviation" is used as a measure for the dynamics of the driving style. This makes it possible to provide a more reliable differentiation between critical situations and desired changes in handling.

DRAWINGS

An example of the present invention will now be explained by referring to the accompanying drawing on the basis of a preferred embodiment.

FIG. 1 shows a flow chart to explain the present invention.

DESCRIPTION OF THE EXEMPLARY EMBODIMENT

FIG. 1 shows a flow chart to explain the present invention. The step symbols shown in the flow chart have the following meanings:

| | |
|---|---|
| S1: | Generation of a steering angle signal |
| T1: | Generation of a transverse acceleration signal |
| S2: | Low-pass filtering |
| T2: | Low-pass filtering |
| S3: | Generation of difference |
| T3: | Generation of difference |
| S4: | Generation of absolute value |
| T4: | Generation of absolute value |
| ST5: | Set driving condition factor ro "non-steady-state"; driving condition = 0 |
| ST6: | Absolute difference of steering angle signal < maximum steering angle signal AND absolute difference of transverse acceleration signal < maximum transverse acceleration signal? |
| ST7: | Normalize absolute difference of steering angle signal to maximum difference of steering angle signal; standardize absolute value of transverse acceleration signal to maximum difference of transverse acceleration signal; determine the maximum of the normalized values |
| ST8: | Calculate factor for driving condition |
| ST9: | Output value F for driving condition |

In the method according to the present invention, the steering angle signal $L_w$ from step S1 and the transverse acceleration signal $a_y$ from step T1 are both initially routed to low-pass filters S2 and T2, respectively. Then in step S3 the difference between the raw steering angle signal and the low-pass filtered steering angle signal is generated. In a comparable manner, in step T3 the difference between the raw transverse acceleration signal and the low-pass filtered acceleration signal is generated. In step S4 the absolute value of the difference generated in step S3 is generated. In step T4 the absolute value of the difference generated in step T3 is generated.

In a subsequent step ST5 the variable for the driving condition is initialized, i.e., the value 0 standing for "non-steady-state" is assigned to the driving condition. The absolute values generated in step S4 and step T4, respectively, are compared to maximum absolute values in step ST6. If the absolute value of the difference in the steering angle signals is smaller than a maximum value, and if the absolute value of the transverse acceleration signals is also smaller than another maximum value, the process branches to step ST7.

In step ST7 the absolute values of the differences are normalized to the respective maximum values. The maximum of these two normalized absolute values is also established. This variable is then used in step ST8 to calculate the variable F for the driving condition, which is output in step ST9.

If it turns out in step ST6 that the absolute values of the differences are greater than or equal to the respective maximum absolute values, then the variable for the driving condition is assigned the value 0 in every case, i.e., the value from step ST5 which stands for the "non-steady-state" driving condition.

For reasons of robustness, the variable for the driving condition may also be filtered to the effect that non-steady-state values are taken over immediately, but steady-state values are limited in gradient over a time window. If the variable for the driving condition in the current cycle is designated as $F_{new}$ and the variable for the driving condition in the preceding cycle as $F_{old}$, then the variable for the driving condition in each 20 ms cycle is assigned such that $$F=F_{new} \text{ if } F_{new}<F_{old}$$

i.e., $F_{new}$ is "more non-steady-state" than $F_{old}$.
and/or $$F=F_{old}+1 \text{ if } F_{new}>F_{old}$$

i.e., $F_{new}$ is "more steady-state" than $F_{old}$.

Depending on the cycle time setting, this may occur for example every 200 ms.

The preceding description of the exemplary embodiments according to the present invention is intended only for purposes of illustration, and not for the purpose of limiting the invention. Various changes and modifications are possible within the framework of the present invention without leaving the scope of the present invention and its equivalents.

What is claimed is:

1. A system for monitoring a driving condition of a vehicle, comprising:
an arrangement for generating a steering angle signal;
an arrangement for generating a transverse acceleration signal;
low-pass filters configured to receive the steering angle signal and the transverse acceleration signal which are each routed to the low-pass filters, and to output a filtered steering angle signal and a filtered transverse acceleration signal;
an arrangement for generating a first absolute value of a difference between the steering angle signal and the filtered steering angle signal;
an arrangement for generating a second absolute value of a difference between the transverse acceleration signal and the filtered transverse acceleration signal;
an arrangement for performing a first comparison of the first absolute value to a maximum steering angle signal; and
an arrangement for performing a second comparison of the second absolute value to a maximum transverse acceleration signal;
wherein a variable describing the driving condition of the vehicle is derived from the first and second comparisons.

2. The system according to claim 1, wherein the first absolute value of the difference between the steering angle signal and the filtered steering angle signal is normalized to the maximum steering angle signal, and wherein the second absolute value of the difference between the transverse acceleration signal and the filtered transverse acceleration signal is normalized to the maximum transverse acceleration signal, and wherein the variable describing the driving condition of the vehicle is derived at least based on the normalized absolute values.

3. The system according to claim 2, wherein the variable describing the driving condition of the vehicle is derived from a maximum of the normalized absolute values.

4. The system according to claim 2, wherein the first absolute value of the difference between the steering angle signal and the filtered steering angle signal is compared to the maximum steering angle signal, and wherein the normalized absolute value of the difference between the steering angle signal and the filtered steering angle signal is assigned a value of 100% if the first absolute value of the difference between the steering angle signal and the filtered steering angle signal is one of greater than and equal to the maximum steering angle signal.

5. The system according to claim 2, wherein the second absolute value of the difference between the transverse acceleration signal and the filtered transverse acceleration signal is compared to the maximum transverse acceleration signal, and wherein the normalized absolute value of the difference between the transverse acceleration signal and the filtered transverse acceleration signal is assigned a value of 100% if the absolute value of the difference between the transverse acceleration signal and the filtered transverse acceleration signal is one of greater than and equal to the maximum transverse acceleration signal.

6. The system according to claim 1, wherein a change in the driving condition to a non-steady-state driving condition is accounted by the variable describing the driving condition.

7. The system according to claim 1, wherein a change in the driving condition to the steady-state driving condition is accounted by the variable describing the driving condition to limit a gradient of the change over a specified time period.

8. A method of monitoring a driving condition of a vehicle, comprising:

generating of a steering angle signal;

generating of a transverse acceleration signal;

routine the steering angle signal and the transverse acceleration signal to a low-pass filter;

outputting a filtered steering angle signal and a filtered transverse acceleration signal from the low-pass filter;

generating a first absolute value of a difference between the steering angle signal and the filtered steering angle signal;

generating a second absolute value of a difference between the transverse acceleration signal and the filtered transverse acceleration signal;

comparing the first absolute value to a maximum steering angle signal;

comparing the second absolute value to a maximum transverse acceleration signal; and deriving a variable describing the driving condition of the vehicle from the comparisons.

9. The method according to claim 8, further comprising:

normalizing the first absolute value of the difference between the steering angle signal and the filtered steering angle signal to the maximum steering angle signal; and normalizing the second absolute value of the difference between the transverse acceleration signal and the filtered transverse acceleration signal to the maximum transverse acceleration signal;

wherein the variable describing the driving condition of the vehicle is derived at least based on the normalized absolute values.

10. The method according to claim 9, wherein the variable describing the driving condition of the vehicle is derived at least based on a maximum of the normalized absolute values.

11. The method according to claim 9, further comprising:

assigning the normalized absolute value of the difference between the steering angle signal and the filtered steering angle signal a value of 100% if the first absolute value of the difference between the steering angle signal and the filtered steering angle signal is one of greater than and equal to the maximum steering angle signal.

12. The method according to claim 9, further comprising:

assigning the normalized absolute value of the difference between the transverse acceleration signal and the filtered transverse acceleration signal a value of 100% if the second absolute value of the difference between the transverse acceleration signal and the filtered transverse acceleration signal is one of greater than and equal to the maximum transverse acceleration signal.

13. The method according to claim 8, further comprising:

inputting into the variable describing the driving condition a change in the driving condition to a non-steady-state driving condition.

14. The method according to claim 8, further comprising:

inputting into the variable describing the driving condition a change in the driving condition to a steady-state driving condition to limit a gradient of the change over a specified time period.

* * * * *

UNITED STATES PATENT AND TRADEMARK OFFICE
CERTIFICATE OF CORRECTION

PATENT NO.    : 6,842,675 B2
DATED         : January 11, 2005
INVENTOR(S)   : Klaus Landesfeind et al.

It is certified that error appears in the above-identified patent and that said Letters Patent is hereby corrected as shown below:

Title page,
Item [57], ABSTRACT,
Line 1, change "The present invention relates to an" to -- An --.
Line 2, change "having a means for" to -- having an arrangement for --.
Lines 3 and 6, delete "($L_w$)".
Line 3, change "and means for" to -- and an arrangement for --.
Line 4, change "signal ($a_y$)," to -- signal, --.
Line 4, change "means being" to -- an arrangement being --.
Line 6, change "signal, means" to -- signal, arrangement --.
Line 8, delete "($a_y$)".
Line 9, delete "(F)".
Line 11, change "The present invention also relates to" to -- Also provided is --.

Column 1,
Line 4, insert heading "Field of the Invention".
Line 6, change "using means of generating" to -- using an arrangement for generating --.
Line 7, change "and means of generating" to -- and an arrangement for generating --.
Line 10, change "having these steps: generating" to -- having the steps of generating --.
Line 18, delete "known as".
Line 45, change "Advantages of the Invention" to -- Summary --.
Line 48, change "means of comparing" to -- an arrangement for comparing --.
Line 50, change "means for comparing" to -- arrangement for comparing --.
Line 61, change "It is preferred that the" to -- The --.
Line 62, change "signal each be routable" to -- signal may each be routable --.
Line 65, change "means be provided" to -- an arrangement is provided --.
Line 67, change "that means be provided" to -- that arrangement being provided --.

Column 2,
Line 9, change "It is particularly preferred for the" to -- The --.
Line 11, change "to be normalized" to -- may be normalized --.
Lines 18-19, change "0% preferably correspond to" to -- wherein 0% may correspond to --.
Line 20, change "100% corresponding to" to -- 100% may correspond to --.
Line 24, change "It is advantageous that a" to -- A --.
Line 29, change "It is particularly advantageous for the" to -- The --.
Line 31, change "signal to be compared" to -- signal may be compared --.
Line 38, change "it is possible to provide a variable" to -- a variable may be provided --.
Line 43, delete "it is advantageous for".
Line 47, change "and for a value of 100% to be assigned" to -- and a value of 100% may be assigned --.
Line 60, change "It is preferred that a" to -- A --.
Line 61, change "condition be taken" to -- condition may be taken --.

UNITED STATES PATENT AND TRADEMARK OFFICE
CERTIFICATE OF CORRECTION

PATENT NO. : 6,842,675 B2
DATED : January 11, 2005
INVENTOR(S) : Klaus Landesfeind et al.

It is certified that error appears in the above-identified patent and that said Letters Patent is hereby corrected as shown below:

Column 3,
Line 1, change "It is preferred, however, that a" to -- A --.
Line 2, change "be taken over" to -- may be taken over --.
Line 5, change "done in such a way that" to -- done such that --.
Line 25, change "It is preferred that" to -- In an example embodiment --.
Line 26, change "signal each be routed" to -- signal may each be routed --.
Line 28, change "signal being output" to -- signal may be output --.
Line 28, change "filters; that" to -- filters; --.
Line 30, change "angle signal be" to -- angle signal may be --.
Line 34, change "vehicle be derived" to -- vehicle may be derived --.
Line 40, change "It is also advantageous for" to -- In an example embodiment --.
Line 42, change "to be normalized" to -- may be normalized --.
Line 43, change "for the absolute value" to -- the absolute value --.
Line 45, change "to be normalized" to -- may be normalized --.
Line 46, change "to be derived" to -- may be derived --.
Lines 49-50, change "0% preferably corresponding to" to -- wherein 0% may correspond to --.
Line 55, change "The method . . . the fact that a" to -- A --.
Line 57, change "is derived from" to -- may be derived from --.
Line 61, change "It is advantageous that the" to -- The --.
Line 63, change "signal is compared" to -- signal may be compared --.
Line 64, change "that a value of 100% is assigned" to -- a value of 100% may be assigned --.

Column 4,
Line 8, delete "method is advantageous due to the fact that the".
Line 11, change "signal is compared" to -- signal may be compared --.
Line 12, change "and that a value of 100% is assigned to" to -- and a value of 100% may be assigned to --.
Lines 26-27, change "The method . . . by having" to -- Another exemplary method may have --.
Line 28, change "condition be taken over" to -- condition which may be taken over --.
Line 35, change "it is also advantageous that" to -- it may also be provided that --.
Lines 40-41, change "the variable of the driving condition" to -- wherein the variable of the driving condition --.
Lines 49-50, change "This makes" to -- This allows --.
Line 51, delete "to advantage".
Line 57, change "This makes it possible to provide" to -- This provides --.
Line 62, change "Drawings" to -- Brief Description of the Drawing --.
Line 63, delete "An example of . . . preferred embodiment."
Line 67, change "FIG. 1 shows" to -- FIG. 1 is --.

UNITED STATES PATENT AND TRADEMARK OFFICE
CERTIFICATE OF CORRECTION

PATENT NO. : 6,842,675 B2
DATED : January 11, 2005
INVENTOR(S) : Klaus Landesfeind et al.

It is certified that error appears in the above-identified patent and that said Letters Patent is hereby corrected as shown below:

Column 5,
Lines 1-2, change "Description of the Exemplary Embodiment" to -- Detailed Description --.
Line 3, change "FIG. 1 shows" to -- FIG. 1 is --.
Line 4, change "The step signals shown" to -- The step signals illustrated --.
Line 56, change "If it turns out" to -- If it is determined --.

Signed and Sealed this

Seventh Day of February, 2006

JON W. DUDAS
*Director of the United States Patent and Trademark Office*